United States Patent [19]

Volpenhein

[11] Patent Number: 4,582,715
[45] Date of Patent: Apr. 15, 1986

[54] ACYLATED GLYCERIDES USEFUL IN LOW CALORIE FAT-CONTAINING FOOD COMPOSITIONS

[75] Inventor: Robert A. Volpenhein, Cincinnati, Ohio

[73] Assignee: The Procter & Gamble Company, Cincinnati, Ohio

[21] Appl. No.: 677,787

[22] Filed: Dec. 4, 1984

[51] Int. Cl.$^4$ ........................... A23D 3/00; A23D 5/00
[52] U.S. Cl. ..................................... 426/601; 426/602; 426/603; 426/605; 426/606; 426/611; 260/410.7
[58] Field of Search ............... 426/601, 603, 604, 611, 426/612, 602, 605, 606; 260/410.6, 410.7, 410.8, 410.9

[56] References Cited

U.S. PATENT DOCUMENTS

| | | |
|---|---|---|
| 1,925,063 | 8/1933 | Tressler . |
| 2,236,516 | 4/1941 | Cahn et al. . |
| 2,236,517 | 4/1941 | Cahn et al. ........................... 260/410 |
| 2,584,998 | 2/1952 | Filachione et al. ............... 260/410.8 |
| 2,652,410 | 9/1953 | Cunningham et al. . |
| 2,690,971 | 10/1954 | Iveson et al. ..................... 260/410.8 |
| 2,721,188 | 10/1953 | Polly et al. . |
| 2,957,932 | 10/1960 | Radlove et al. . |
| 2,962,419 | 11/1960 | Minich . |
| 2,966,386 | 8/1961 | Radlove . |
| 2,966,410 | 12/1960 | Chang et al. . |
| 3,012,047 | 12/1961 | Woods ............................. 260/410.8 |
| 3,579,548 | 5/1971 | Whyte . |
| 3,600,186 | 8/1971 | Mattson et al. . |
| 3,681,440 | 8/1972 | Gash . |
| 4,005,195 | 1/1977 | Jandacek . |
| 4,005,196 | 1/1977 | Jandacek et al. . |
| 4,247,568 | 1/1981 | Carrington et al. . |
| 4,334,061 | 6/1982 | Bossier, III ..................... 260/410.6 |
| 4,363,763 | 12/1982 | Peterson . |

OTHER PUBLICATIONS

D. Hanam, "Preparation and Evaluation of Trialkoxytricarballylate, Trialkoxycitrate, Trialkoxyglycorolether, Jojoba Oil and Sucrose Polyester as Low Calorie Replacements of Edible Fats and Oils," *J. Food Sci.*, vol. 49, (1984), pp. 419–428.

Brockerhoff, "Substrate Specificity of Pancreatic Lipase: Influence of the Structure of Fatty Acids on Reactivity of Esters," *Biochem. Biophy. Acta.*, vol. 22, (1970), pp. 92–101.

Payne-Wahl et al., "Separation of Tetra, Penta, and Hexa Acyl Triglycerides by High Performance Liquid Chromatography," *Lipids*, vol. 14, (1979), pp. 601–605.

Plattner et al., "Hydroxy Acids and Estolide Triglycerides of *Heliophila amplexicaulis* L.f. Seed Oil," *Lipids*, vol. 14, (1979), pp. 576–579.

Kleiman et al., "Tetra-Acid Triglycerides Containing a New Hydroxy Eicosadienoyl Moiety in *Lesquerella auriculata* Seed Oil," *Lipids*, vol. 7, (1979) pp. 660–665.

Mattson et al., "Rate and Extent of Absorption of the Fatty Acids of Fully Esterified Glycerol, Erythritol, Xylitol, and Sucrose as Measured in Thoracic Duct Cannulated Rats," *J. Nutrition*, vol. 102, (1972), pp. 1177–1180.

Primary Examiner—Robert Yoncoskie
Attorney, Agent, or Firm—Eric W. Guttag; Steven J. Goldstein; Richard C. Witte

[57] ABSTRACT alpha-Acylated glycerides having the formula:

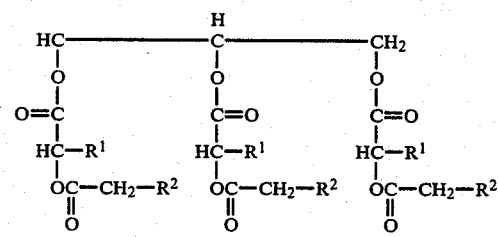

wherein each $R^1$ is a $C_{10}$–$C_{14}$ alkyl group and wherein each $R^2$ is a $C_{14}$–$C_{16}$ aliphatic group are disclosed. These alpha-acylated glycerides are useful as nondigestible fats in low calorie fat-containing food compositions.

16 Claims, No Drawings

ACYLATED GLYCERIDES USEFUL IN LOW CALORIE FAT-CONTAINING FOOD COMPOSITIONS

TECHNICAL FIELD

This application relates to acylated glycerides which are less digestible than standard triglycerides and in particular the use of these acylated glycerides in low calorie fat-containing food compositions.

One of the most common metabolic problems among people today is obesity. This condition is due to a greater intake of calories than are expended. Fat is the most concentrated form of energy in the diet with each gram supplying approximately 9 calories. Overall, fat constitutes about 40% of the total calories in the diet. If the available calories from fat could be lowered without a decrease in the amount eaten, this would offer a very convenient and practical method by which obesity could be overcome.

Triglycerides are the main component of edible fats and constitute 90% of the total amount consumed. One method by which the caloric value of edible fat could be lowered would be to decrease the amount of triglyceride that is absorbed in the human system. The usual edible triglyceride fats are almost completely absorbed. The absorbability of triglyceride fats can be decreased by altering the alcohol portion of the molecule. For example, sugar or sugar alcohol fatty acid esters having at least 4 fatty acid ester groups have been used as non-digestible fats. See U.S. Pat. No. 3,600,186 to Mattson et al., issued Aug. 17, 1971. See also U.S. Pat. No. 2,962,419 to Minich, issued Nov. 29, 1969, which discloses non-digestible esters formed by the reaction of a fatty acid with a polyol such as pentaerythritol.

Less digestible or absorbed fats have also been made by modification of the fatty acid portion of the ester. For example, U.S. Pat. No. 3,579,548 to Whyte, issued May 18, 1971, discloses glycerol esters of alpha-branched carboxylic acids having the formula:

$$\begin{array}{c} H_2C-X \\ | \\ HC-Y \\ | \\ H_2C-Z \end{array}$$

where X is an alpha-branched carboxylic acid residue, and Y and Z are standard fatty acid residues or are preferably an alpha-branched carboxylic acid residue like X. See also D. Hamm, "Preparation and Evaluation of Trialkoxytricarballyate, Trialkoxycitrate, Trialkoxyglycerolether, Jojoba Oil and Sucrose Polyester as Low Calorie Replacements of Edible Fats and Oils," *J. Food Sci.*, Vol. 49, (1984), pp. 419–28, which discloses the use of trialkoxycitrate or trialkoxytricarballyate as low calorie replacements of conventional edible fats and oils.

A significant problem in attempting to formulate fat compounds that have decreased absorbability and thus low calorie properties is to maintain the desirable and conventional physical properties of edible fat. To be practical, the low calorie fat must resemble conventional triglyceride fat and have the same utility in various fat-containing food compositions such as shortening, margarine and cake mixes. However, the combination of desirable fat-like properties with decreased absorbability or digestibility cannot be predicted with any degree of accuracy. Accordingly, selection of non-digestible fats suitable for food compositions is still a "hit or miss" proposition.

BACKGROUND ART

A. Acylated alpha-Hydroxy Fatty Acid Esters of Glycerol

U.S. Pat. No. 2,652,410 to Cunningham et al., issued Sept. 15, 1953, discloses the preparation of alpha-hydroxy acids and their estolides (esterification product of two alpha-hydroxy acids) by the oxidation of petroleum waxes. The alpha-hydroxy acids have from about 5 to 30 carbon atoms per molecule while the estolides have from about 10 to 60 carbon atoms per molecule. These acids and estolides are obtained by oxidation of mixtures of straight chain paraffins containing between 15 and 50 carbon atoms per molecule, preferably about 20 to 35 carbon atoms per molecule. The estolides can be dehydroxylated to form an alpha, beta unsaturation. These alpha-hydroxy acids and estolides can be esterified with various polyols, including glycerol, to provide semi-solid or solid products for linoleum cements and drying oils. See, in particular, Examples VI, VII, IX and X. See also U.S. Pat. No. 2,721,188 to Polly et al. issued Oct. 18, 1955, which has a similar disclosure.

B. Low-Calorie Substitute Fats Based on Glycerol Esters

U.S. Pat. No. 3,579,548 to Whyte, issued May 18, 1971, discloses glycerol esters of alpha-branched carboxylic acids having the formula:

$$\begin{array}{c} H_2C-X \\ | \\ HC-Y \\ | \\ H_2C-Z \end{array}$$

where X is an alpha-branched carboxylic acid residue having the formula:

$$-O\overset{O}{\overset{\|}{C}}-\overset{R^1}{\underset{R^2}{\overset{|}{C}}}-R^3$$

where $R^1$ and $R^2$ are $C_1$–$C_{30}$ alkyl groups, $R^3$ is hydrogen or a $C_1$–$C_{30}$ alkyl group, the total number of carbon atoms for $R^1+R^2+R^3$ being from 8 to 30 and Y and Z are X, OH, or $$-O\overset{O}{\overset{\|}{C}}R^4$$

where $R^4$ is a $C_8$–$C_{30}$ alkyl or alkenyl group. These glycerol esters of alpha-branched carboxylic acids have the physical properties and utility of standard triglyceride fats but are less digested or absorbed. See also D. Hamm, "Preparation and Evaluation of Trialkoxytricarballyate, Trialkoxycitrate, Trialkoxyglycerolether, Jojoba Oil and Sucrose Polyester as Low Calorie Replacements of Edible Fats and Oils," *J. Food Sci.*, Vol. 49, (1984), pp 419–28, which discloses the use of trialkoxycitrate or trialkoxytricarballyate as low calorie replacements of conventional edible fats and oils.

C. Substrate Specificity of Pancreatic Lipase

Brockerhoff, "Substrate Specificity of Pancreatic Lipase: Influence of the Structure of Fatty Acids on the Reactivity of Esters," *Biochim. Biophy. Acta*, Vol. 22, (1970), pp 92–101, describes the results of studies where various monoesters of aliphatic acids were hydrolyzed with pancreatic lipase. It was found that methyl or like substituents, or unsaturation, at the 2 to 5 carbon atoms of the acid led to a relative resistance of the esters against lipase.

DISCLOSURE OF THE INVENTION

The present invention relates to acylated glycerides having the formula (I):

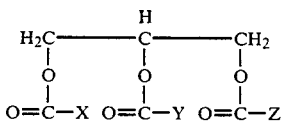

where at least one of the X, Y and Z groups is an acylated group having the formula (II):

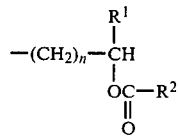

where $R^1$ is a $C_2-C_{20}$ aliphatic group; n is 0 to 4; $R^2$ is a $C_2-C_{21}$ aliphatic group; the remainder of the X, Y and Z groups being a $C_1-C_{21}$ aliphatic group or the acylated group of formula II. These glycerides can be used in low-fat containing food compositions, which comprise: (a) non-fat ingredients; and (b) fat ingredients, from about 10 to 100% by weight of the fat ingredients consisting essentially of the acylated glycerides of the present invention.

The acylated glycerides of the present invention (and fat-containing food compositions containing these compounds) have desirable physical properties and palatability compared to ordinary triglyceride fats and compositions containing same. However, these acylated glycerides have a substantially lower effective caloric value because they are less digested or absorbed than ordinary triglyceride fat in the intestinal tract. The acylated glycerides of the present invention and food compositions containing these compounds which are low in available calories are referred to in this application as "low calorie".

A. Acylated Glycerides

The acylated glycerides of the present invention have the formula (I):

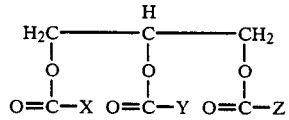

At least one of the X, Y and Z groups is an acylated group having the formula (II):

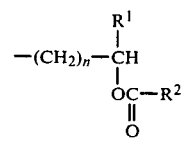

From in vitro experiments, it has been found that, as the number of acylated groups of formula II increases, i.e. from 1 to 2 to 3, the acylated glyceride is hydrolyzed less by pancreatic enzymes. Preferably, each of groups X, Y and Z are the acylated group of formula II.

The $R^1$ group can be a linear or branched $C_2-C_{20}$ aliphatic group, but is typically a $C_8-C_{20}$ aliphatic group. Also, the aliphatic group can be saturated or unsaturated, substituted (e.g. hydroxy) or unsubstituted. Some representative $R^1$ groups include ethyl, propyl, butyl, pentyl, hexyl, octyl, decyl, dodecyl, tetradecyl, hexadecyl and octadecyl. Preferred aliphatic groups are those where $R^1$ is linear $C_8-C_{14}$ aliphatic and most preferably linear $C_{10}-C_{14}$ alkyl, i.e. n-decyl, n-dodecyl or n-tetradecyl.

The n value can range from 0 to 4, i.e. can be 0, 1, 2, 3 or 4. Preferably, n is 0, i.e. alpha-acylated glycerides.

As with the $R^1$ group, the $R^2$ group can be a linear or branched $C_2-C_{21}$ aliphatic group. Also, the $R^2$ group can be saturated or unsaturated, substituted or unsubstituted aliphatic. Suitable $R^2$ groups include those derived from propionic acid, butyric acid, valeric acid, caproic acid, caprylic acid, capric acid, myristic acid, palmitic acid, stearic acid, oleic acid, linoleic acid, linolenic acid, ricinoleic acid and the like. From in vitro experiments, it has been found that, as the number of carbon atoms of the $R^2$ group increases, pancreatic enzymes hydrolyze the respective acylated glyceride less. $R^2$ is typically the group $-CH_2-R^3$ wherein $R^3$ is a $C_1-C_{20}$ aliphatic group. Preferred $R^3$ groups include linear $C_{14}-C_{16}$ aliphatic groups (e.g. those derived from palmitic acid, stearic acid, oleic acid, linoleic acid and linolenic acid). The $R^3$ groups are preferably linear $C_{16}$ unsaturated aliphatic groups (e.g. those derived from oleic acid, linoleic acid, and linolenic acid).

Particularly preferred acylated glycerides are the alpha-acylated glycerides having the formula:

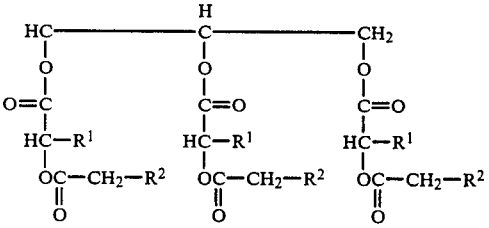

wherein each $R^1$ is a linear $C_{10}-C_{14}$ alkyl group and wherein each $R^2$ is a linear $C_{14}-C_{16}$ aliphatic group.

B. Methods for Making Acylated Glycerides

The acylated glycerides of the present invention can be prepared by standard methods for making triglycerides or other ester compounds. For example, glycerol can be reacted with the methyl ester of a protected alpha-hydroxy fatty acid to form the respective triglyceride. The alpha-hydroxy fatty acids can be obtained by methods disclosed in U.S. Pat. No. 4,363,763 to Peterson, issued Dec. 14, 1982, which is incorporated by reference. Particularly suitable alpha-hydroxy fatty acids include alpha-hydroxy lauric acid, alpha-hydroxy myristic acid and alpha-hydroxy palmitic acid. Once the protecting group is removed, the alpha-hydroxy fatty acid triglyceride can be esterified with the acid chloride of a standard fatty acid to form the respective acylated glyceride. Particularly preferred acid chlorides are those derived from palmitic acid, stearic acid, oleic acid, linoleic acid and linoleic acid. The glycerol monoesters of the alpha-hydroxy fatty acids disclosed in U.S. Pat. No. 4,363,763 to Peterson, issued Dec. 14, 1982, which is incorporated by reference, can also be acylated with these acid chlorides to form glycerides of the present invention having one acylated group.

Other methods can also be used to make the acylated glycerides of the present invention. One such method involves the reaction of glycerol with the 2-methoxyethyl ester of a protected alpha-hydroxy fatty acid. After the protecting group is removed, esterification of the alpha-hydroxy glyceride is completed with a standard fatty acid or fatty acid anhydride according to the methods disclosed in U.S. Pat. No. 3,410,881 to Martin et al, issued Nov. 12, 1968 or U.S. Pat. No. Re. 28,737 to Yetter, reissued Mar. 16, 1976, which are incorporated by reference.

Another method which can be used to make the acylated glycerides of the present invention involves the reaction of glycerol with the methyl esters of (unprotected) alpha-hydroxy fatty acids and standard fatty acids. In this reaction, the standard fatty acid esters are present in mole excess over the total hydroxyl groups of the alpha-hydroxy fatty acid esters. This base catalyzed reaction yields a mixture of glycerides, including the desired acylated glycerides.

The synthesis of specific alpha-acylated glycerides according to the present invention are as follows:

Glycerol Tri-alpha-Oleoyloxy Laurate

Step 1: Methyl alpha-tetrahydropyranyl laurate.

A 200 g. portion of alpha-chloro lauric acid (see Example I of U.S. Pat. No. 4,148,811 to Crawford, issued Apr. 10, 1979 for preparation) was converted to alpha-hydroxy lauric acid by a procedure similar to that described at column 6, lines 54–63, of U.S. Pat. No. 4,363,763 to Peterson, issued Dec. 14, 1982. This alpha-hydroxy lauric acid was crystallized 3 times from hexane. A portion of this purified alpha-hydroxy acid was converted to the methyl ester by refluxing 30 min. in methanol which contained 1.0% $H_2SO_4$. The ester was washed and then refined with $K_2CO_3$.

A 100 g. portion of this methyl ester was stirred for 10 min. in toluene (200 ml.) which contained 2,3-dihydropyran (55 ml.) and toluene sulfonic acid (0.5 g.). $NaHCO_3$ (1.5 g.) was added to this solution which was then washed with $H_2O$. This washed solution was dried, filtered and then retreated for 10 min. with 2,3-dihydropyran (55 ml.). The toluene was removed under vacuum to yield the desired methyl alpha-tetrahydropyranyl laurate.

Step 2: Glycerol tri-alpha-hydroxy laurate.

Glycerol (10 g., 0.109 moles) and powdered KOH (0.5 g.) were heated and stirred under a vacuum at 100° C. for 30 min. The methyl alpha-tetrahydropyranyl laurate from step 1 (105 g.) was then added. The reaction was conducted under vacuum at 160° C. for 2 hrs. in a reaction flask equipped with a water cooled condenser to return distillate (other than methanol) to the reaction mixture. By the end of this 2 hr. period, the reaction mixture became homogeneous. After the reaction mixture had cooled, the product obtained was dissolved in ether, and then washed with $H_2O$ several times, using ethanol to prevent emulsification. The ether solution (350 ml.) was dried with $Na_2SO_4$ and then filtered. Methanol (300 ml.) and conc. HCl (20 ml.) were then added. The ether solution was stirred for 15 min., washed with $H_2O$ several times and then the ether was removed by evaporation.

The crude product obtained was recrystallized twice from acetone at $-18°$ C. to yield 38.8 g. of an insoluble fraction. This acetone insoluble fraction was recrystallized twice from 20% ethanol/hexane at $-18°$ C. The insoluble product (29 g.) from the ethanol/hexane recrystallization was fractionated by preparative high performance liquid chromatography (HPLC) using 5% tetrahydrofuran (THF)/toluene as the eluting solvent. During this HPLC fractionation, approximately 100–150 ml. cuts were taken which were monitored by thin layer chromatography (TLC). Fractions 1–10 contained nothing. Fractions 11–15 (9 g.) and 16–24 (8.5 g.) which contained the desired product were combined. The combined product from fractions 11–24 was crystallized from acetone at $-18°$ C. to yield 14 g. of an insoluble fraction containing the desired glycerol tri-alpha-hydroxy laurate.

Step 3: Glycerol tri-alpha-oleoyloxy laurate.

Glycerol tri-alpha-hydroxy laurate from step 2 (5 g.) was dissolved in toluene (100 ml.). Pyridine (5 ml.) and oleoyl chloride (9.5 g.) in toluene (50 ml.) were then added. The reaction mixture was allowed to stand overnight. After methanol (20 ml.) was added, the reaction mixture was allowed to stand 1 hr. The reaction mixture was then successively washed with $H_2O$, dilute HCl and $H_2O$. The washed mixture was dried, filtered and then concentrated to yield 14 g. of crude product containing glycerol tri-alpha-oleoyloxy laurate. This crude product can be purified by HPLC and solvent fractionation.

Glycerol Tri-alpha-Decanoyloxy Laurate

Glycerol tri-alpha-hydroxy laurate (6.8 g.) and decanoyl chloride (7.0 g.) were reacted in a toluene solution containing pyridine (7 ml.). After standing overnight, the reaction mixture was successively washed with $H_2O$, dilute HCl, and 3% ethanolic $K_2CO_3$. The washed mixture was dried, filtered and concentrated to yield 12 g. of crude product containing glycerol tri-alpha-decanoyloxy laurate. This crude product can be purified by HPLC and solvent fractionation.

Glycerol Tri-alpha-Propionyloxy Laurate

Glycerol tri-alpha-hydroxy laurate (7 g.), propionyl chloride (5 ml.) and pyridine (5 ml.) were mixed in toluene (200 ml.). Additional acid chloride (3 ml.) and pyridine (3 ml.) was later added to the reaction mixture. After standing overnight, the reaction mixture was successively washed with $H_2O$, dilute HCl and $H_2O$. The toluene was removed to yield 14 g. of crude product containing glycerol tri-alpha-propionyloxy laurate. This crude product can be further purified by HPLC and solvent fractionation.

Glycerol 2-Oleoyl-1,3-alpha-Oleoyloxy Laurate

Step 1: Glycerol 1,3-di-alpha-hydroxy laurate

Methyl alpha-tetrahydropyranyl laurate (65 g.), and glycerol (8 g.) were mixed in 40 ml. of dimethyl acetamide (DMAC). Sodium methoxide (300 mg.) suspended in xylene (3 ml.) was then added. The reaction mixture was then heated under vacuum at 120° C. for 30 min. to distill out the bulk of the DMAC. The vacuum was then reduced to 0.3 mm. Hg and the temperature raised to 160° C. The reaction mixture was then cooled, dissolved in ether and washed twice with 30% ethanol/-H₂O. The ether phase (250 ml.) was diluted with methanol (250 ml.) and then HCl (20 ml.) was added. This solution was stirred for 25 min., washed with H₂O, dried and the ether then removed. The residue was recrystallized twice from acetone at −18° C. to yield an insoluble fraction (6.5 g.) containing the desired glycerol 1,3-di-alpha-hydroxy laurate.

Step 2: 2-oleoyl-1,3-di-alpha-oleoyloxy laurate

Glycerol 1,3-di-alpha-hydroxy laurate from step 1 (3 g.) was acylated with oleoyl chloride in toluene containing pyridine. The crude product was washed with H₂O and ethanolic K₂CO₃, dried and then recovered to yield 11 g. of crude product containing glycerol 2-oleoyl-1,3-di-alpha-oleoyloxy laurate. This crude product can be purified by HPLC and solvent fractionation.

Glycerol 2,3-Dioleoyl-1-alpha-Oleoyloxy Laurate

Glycerol 1-mono-alpha-hydroxy laurate was prepared by a procedure similar to that described at column 6, line 51 to column 7, line 30 of U.S. Pat. No. 4,363,763 to Peterson, issued Dec. 14, 1982. This monoglyceride (6.5 g.) and oleoyl chloride (28.4 g.) were reacted in toluene containing pyridine (5 ml.). After standing overnight, the reaction mixture was washed successively with H₂O, dilute HCl and H₂O. The washed mixture was dried and then the toluene was removed to yield crude product containing glycerol 2,3-dioleoyl-1-alpha-oleoyloxy laurate. This crude product can be purified by HPLC and solvent fractionation.

C. Resistance to Hydrolysis by Pancreatic Enzymes

The non-digestibility of the acylated glycerides of the present invention relative to other glycerides (soybean oil, glycerol tri-oleoyloxy ricinoleate) was determined through in vitro experiments on the resistance to hydrolysis by pancreatic enzymes. These in vitro experiments were conducted as follows:

Each digest contained 300 mg. of the glyceride, 20 ml. of 2M tris(hydroxymethyl)aminomethane, 0.15M NaCl (pH 8.0), 0.5 ml. of 45% CaCl₂ and 200 mg. sodium taurocholate in a 250 ml. glass stoppered Erlenmeyer flask. After shaking for 30 min. on a Barrel wrist action shaker (setting no. 10), 1 ml. of pancreatic fluid was added to the flask and shaking was then continued for either 60 or 120 min. The hydrolyzed fatty acids from the digest were extracted and then quantitated by titration.

The results from this in vitro testing were as follows:

| Substrate | M Moles Fatty Acid Hydrolyzed per ml Rat Pancreatic Juice | | |
|---|---|---|---|
| | 30 min | 60 min | 120 min |
| Soybean Oil | 702 | 752 | 801 |
| Glycerol Tri-Oleoyloxy Ricinoleate | 590 | 786 | — |
| | 600 | 684 | — |
| Glycerol Tri-alpha-Oleoyloxy Laurate | 15 | 11 | 15 |
| | 39 | 44 | — |
| | 2 | 12 | 0 |
| Glycerol Tri-alpha-Decanoyloxy Laurate | 37 | 61 | — |
| Glycerol Tri-alpha-Propionyloxy Laurate | 181 | 314 | — |
| Glycerol 2-Oleoyl-1,3-di-alpha-Oleoyloxy Laurate | 26 | 69 | 103 |
| Glycerol 2,3-Dioleoyl-1-alpha-Oleoyloxy Laurate | 327 | 480 | — |

D. Low-Calorie Fat-Containing Food Compositions

The acylated glycerides of the present invention can be used as partial or total replacements for normal triglyceride fats in any fat-containing food composition to provide low-calorie benefits. The amount of acylated glycerides included in the fat will depend upon the food composition, the low-calorie effect desired, and the digestibility and absorbability of the particular acylated glyceride. In order to obtain a significant low-calorie effect, it is necessary that at least about 10% of the fat in the food composition comprise the acylated glycerides. On the other hand, very low-calorie and thus highly desirable food compositions of the present invention are obtained when the fat comprises up to 100% of the acylated glyceride. Hence, the low-calorie fats of the present invention can be partial or complete replacements for normal triglyceride fats present in salad or cooking oils, or plastic shortenings, which are used in frying, cake making, bread baking, or the like. The low-calorie fats of the present invention can also be partial or complete replacements for normal triglyceride fats present in fat-containing food products such as mayonnaise, margarine, and dairy products.

Specific Embodiments of Low-Calorie Food Compositions Containing Acylated Glycerides The following specific embodiments illustrate low-calorie fat-containing food compositions wherein from about 10 to 100% of the fat comprises an acylated glyceride of the present invention.

| Ingredients: | Percent by weight |
|---|---|
| Example I - Salad Oils | |
| (A) | |
| Refined, bleached, and lightly hydrogenated soybean oil | 50 |
| Glycerol Tri-alpha-Oleoyloxy Laurate | 50 |
| | 100 |
| (B) | |
| Refined cottonseed oil | 90.0 |
| Glycerol Tri-alpha-Oleoyloxy Laurate | 10.0 |
| | 100.00 |
| (C) | |
| Glycerol Tri-alpha-Oleoyloxy Laurate | 100 |
| Example II - Plastic Shortening | |
| (A) | |
| Lightly hydrogenated soybean oil (I.V. 107) | 50 |
| Glycerol Tri-alpha-Stearoyloxy Laurate | 40 |
| Tristearin (hardstock, I.V. 8) | 10 |
| | 100 |
| (B) | |
| 50/50 mixture of hardened cottonseed oil and lard | 40 |
| Monoglycerides of soybean oil | 10 |
| Glycerol Tri-alpha-Stearoyloxy Laurate | 50 |

| Ingredients: | Percent by weight |
|---|---|
| | 100 |
| (C) | |
| Glycerol Tri-alpha-Stearoyloxy Laurate | 100 |
| Example III - Prepared Cake Mix | |
| (a) Specific: | |
| Cake flour | 36 |
| Sugar | 44 |
| Shortening (glycerol tri-alpha-oleoyloxy palmitate) | 13 |
| Nonfat dried milk solids | 4 |
| Leavening | 2 |
| Salt | 1 |
| | 100 |
| (b) General: | |
| Sugar | 35–50 |
| Flour | 25–50 |
| Shortening (glycerol tri-alpha-oleoyloxy palmitate) | 5–30 |
| Leavening | 1–4 |
| Cocoa | 0–7 |
| Egg | 0–5 |
| Milk solids | 0–5 |
| Flavor | 0–5 |
| | 100 |
| Example IV - Prepared Icing Mix | |
| Shortening (50/50 mixture of conventional vegetable shortening and glycerol tri-alpha-stearoyloxy laurate) | 20 |
| Salt | 2 |
| Nonfat dry milk solids | 5 |
| Sugar | 73 |
| | 100 |
| Example V - Mayonnaise | |
| Fat (75:25 blend of glycerol tri-alpha-oleoyloxy laurate and refined cottonseed oil) | 75 |
| Vinegar | 10 |
| Egg yolk | 9 |
| Sugar | 3 |
| Salt | 1 |
| Mustard | 1 |
| Flavor | 1 |
| | 100 |
| Example VI - Salad Dressing | |
| Fat (glycerol tri-alpha-oleoyloxy laurate) | 50 |
| Cornstarch | 5 |
| Vinegar | 10 |
| Water | 35 |
| | 100 |
| Example VII - Margarine | |
| Oil (glycerol tri-alpha-oleoyloxy myristate) | 80 |
| Milk solids | 2 |
| Salt | 2 |
| Monoglyceride | 15 |
| Water | 1 |
| | 100 |

What is claimed is:

1. An acylated glyceride having the formula (I):

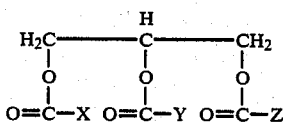

wherein at least one of said X, Y and Z groups is an acylated group having the formula (II):

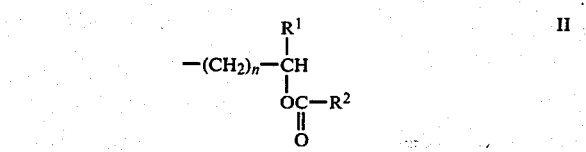

wherein $R^1$ is a $C_8$–$C_{20}$ aliphatic group; n is 0 to 4; $R^2$ is the group —$CH_2$—$R^3$, wherein $R^3$ is a $C_1$–$C_{20}$ aliphatic group; the remainder of said X, Y and Z groups being a $C_1$–$C_{21}$ aliphatic group or the acylated group of formula II.

2. The glyceride of claim 1, wherein n is 0.

3. The glyceride of claim 2, wherein $R^1$ is a linear $C_{10}$–$C_{14}$ alkyl group.

4. The glyceride of claim 3, wherein each of said X, Y and Z groups is said acylated group of formula II.

5. The glyceride of claim 4, wherein $R^3$ is a linear $C_{14}$–$C_{16}$ aliphatic group.

6. The glyceride of claim 5, wherein $R^3$ is a linear $C_{16}$ unsaturated aliphatic group.

7. The glyceride of claim 2, which is selected from the group consisting of glycerol tri-alpha-oleoyloxy laurate, glycerol tri-alpha-decanoyloxy laurate, glycerol tri-alpha-propionyloxy laurate, glycerol 2-oleoyl-1,3-di-alpha-oleoyloxy laurate, glycerol 2,3-dioleoyl-1-alpha-oleoyloxy laurate, glycerol tri-alpha-stearoyloxy laurate, glycerol tri-alpha-oleoyloxy myristate, and glycerol tri-alpha-oleoyloxy palmitate.

8. The glyceride of claim 7, which is selected from the group consisting of glycerol tri-alpha-oleoyloxy laurate, glycerol tri-alpha-decanoyloxy laurate, glycerol 2-oleoyl-1,3-di-alpha-oleoyloxy laurate, glycerol tri-alpha-stearoyloxy laurate, glycerol tri-alpha-oleoyloxy myristate, and glycerol tri-alpha-oleoyloxy palmitate.

9. A low-calorie fat containing food composition, which comprises:
(a) non-fat ingredients; and
(b) fat ingredients, from about 10 to 100% by weight of said fat ingredients consisting essentially of an acylated glyceride having the formula (I):

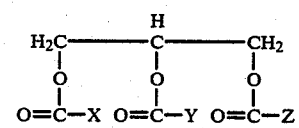

wherein at least one of the X, Y and Z groups is an acylated group having the formula (II):

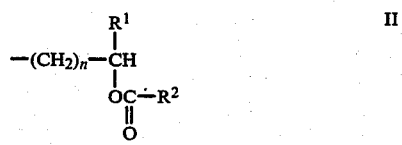

wherein $R^1$ is a $C_2$–$C_{20}$ aliphatic group; n is 0 to 4; $R^2$ is a $C_1$–$C_{21}$ aliphatic group; the remainder of the X, Y and Z groups being a $C_1$–$C_{21}$ aliphatic group or the acylated group of formula II.

10. The composition of claim 9, wherein n is 0.

11. The composition of claim 10, wherein $R^1$ is a $C_8$–$C_{14}$ aliphatic group.

12. The composition of claim 11, wherein $R^1$ is a linear $C_{10}$–$C_{14}$ alkyl group.

13. The composition of claim 12, wherein each of said X, Y and Z groups is said acylated group of formula II.

14. The composition of claim 13, wherein $R^2$ is the group —$CH_2$—$R^3$, wherein $R^3$ is a linear $C_{14}$–$C_{16}$ aliphatic group.

15. The composition of claim 14, wherein $R^3$ is a linear $C_{16}$ unsaturated aliphatic group.

16. The composition of claim 9, wherein said acylated glyceride is selected from the group consisting of glycerol tri-alpha-oleoyloxy laurate, glycerol tri-alpha-stearoyloxy laurate, glycerol tri-alpha-oleoyloxy palmitate, and glycerol tri-alpha-oleoyl myristate.

* * * * *